(No Model.)
F. H. HEATH.
BICYCLE BRAKE.
No. 603,331. Patented May 3, 1898.
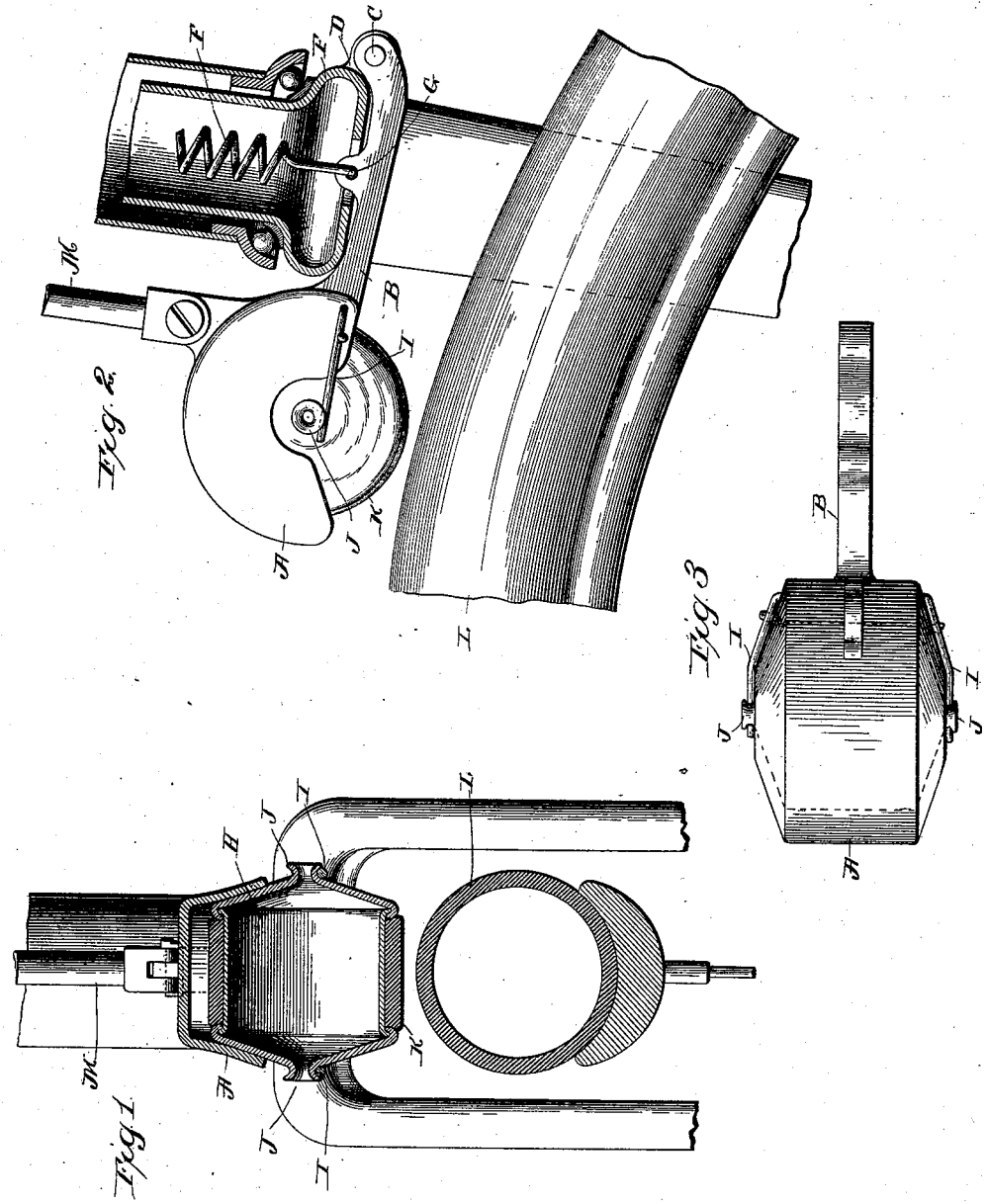
WITNESSES:
INVENTOR
Fredrick H Heath
BY
ATTORNEY

UNITED STATES PATENT OFFICE.

FREDERICK H. HEATH, OF TACOMA, WASHINGTON.

BICYCLE-BRAKE.

SPECIFICATION forming part of Letters Patent No. 603,331, dated May 3, 1898.

Application filed January 19, 1897. Serial No. 619,716. (No model.)

*To all whom it may concern:*

Be it known that I, FREDERICK H. HEATH, a citizen of the United States, residing at Tacoma, in the county of Pierce and State of Washington, have invented a certain new and useful Improvement in Bicycle-Brakes, of which the following is a specification.

My invention relates to a new and useful improvement in bicycle-brakes, and has for its object to so construct such a device as to permit the retarding of the revolution of the wheels without bringing friction to bear thereon, which, as is well known, tends to wear and heat the tire, and in the case of a pneumatic tire renders it useless, thereby necessitating its being replaced at a considerable expense.

With this end in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1 is a front view of a portion of a bicycle-fork, showing my improvement in section; Fig. 2, a vertical section of said fork, illustrating the manner in which my improvement is applied thereto; and Fig. 3, a detailed plan view of the brake and housing.

In the embodiment of my improvement here shown, A represents a housing, which may be formed of sheet metal or cast in shape, from which projects the lever B, the latter being pivoted at C between the ears D, projecting from the fork-head E. This lever and housing are held in a normally-elevated position by the spring F, which is arranged within the fork-tube and is connected at G to the lever, as clearly shown in Fig. 2.

The cross-section of the interior of the housing is of the general shape of a cross-section of a truncated cone, the object being to produce interior beveled walls which converge upwardly toward each other and to which is attached the brake-roll H. This roll is of cylindrical form, here shown as having a central body section and two sections secured thereto by flanging. These sections in cross-section are adapted to the bevel sides of the housing, as clearly shown in Fig. 1, so that when pressure is brought to bear upon the under side of the roll it will be forced into the housing in such manner as to increase the friction between the ends of said roll and the inner walls of the sides of the housing.

For convenience in holding a roll in place against accidental displacement the spring-arms I are secured to the outer walls of the casing and project into contact with the under side of the hubs J of the roll, so as to constantly force the roll upwardly, yet when it is necessary to remove this roll for any purpose these arms may be sprung out of contact with the hubs, thereby leaving the roll free to be removed.

The body of the roll has fitted thereon a rubber band K, arranged to bear against the tire L in order to produce the desired amount of traction between said tire and roll, so that it will be seen that when this roll is forced into contact with the tire of the wheel it will be caused to revolve therewith, and it is obvious that friction applied to the roll to retard its movement will also retard the movement of the wheel upon which the tire is secured.

The housing has connected therewith the brake-rod M, which leads to any suitable handle for the depression of the housing, and when a rider applies the brake by the use of this mechanism and forces the roll into contact with the tire an increased friction will be generated between the ends of the roll and the housing by being crowded into the latter, as before described, and the greater the pressure applied to the brake to cause it to revolve with the tire the greater will be the retarding friction created between the roll and housing, thus affording the desired amount of resistance to the revolving of the wheel for the purpose of controlling the motion of the bicycle.

In practice it has been found that at least three-fourths of the traction power between the tire and roll may be absorbed by the friction between the roll and its housing, and as the traction power increases in proportion as the friction increases, on account of the same downward force securing both, it is obvious that the retarding action upon the wheel may be increased indefinitely.

By the use of my improvement the detrimental action which has heretofore taken place by the application of the brake to the tire, especially a pneumatic tire—such as heating, wearing, and burning, as well as grooving—is entirely overcome. The friction utilized for the regulation of the speed of the bicycle is the pressure from the tire to the ends of the roll, and when this roll becomes worn it may be easily replaced by another, as before described.

The housing not only serves for the generation of friction therebetween and the roll, but it also acts as a protector to the roll in shedding dirt or injurious substances which would be likely to accumulate upon the upper end of said roll.

As will be seen from this description, the cost of producing a brake made in accordance with my improvement is but little in excess of the cost of an ordinary friction-brake.

These advantages are so marked over the last-named brake as to render it indispensable for use in connection with pneumatic tires.

Having thus fully described my invention, what I claim as new and useful is—

In combination, a housing pivoted to the fork-crown of a bicycle, said housing having flared sides, said sides having indentations cut in their lower edges, spring-arms secured to the sides and projecting below and beyond said indentations, a hollow cylinder to fit within the housing, conical ends formed of sheet metal, of a slant corresponding to the slant of the sides, secured on the ends of the cylinder, hubs formed at the apex of the cones by curving the walls outward and downward to form a groove, said hubs resting on the spring-arms, means for depressing said housing substantially as described.

In testimony whereof I have hereunto affixed my signature in the presence of two subscribing witnesses.

FREDERICK H. HEATH.

Witnesses:
S. S. WILLIAMSON,
WM. S. PERRY.